United States Patent
Kim et al.

(10) Patent No.: US 11,803,744 B2
(45) Date of Patent: Oct. 31, 2023

(54) NEURAL NETWORK LEARNING APPARATUS FOR DEEP LEARNING AND METHOD THEREOF

(71) Applicant: LG Electronics Inc., Seoul (KR)

(72) Inventors: Byoung Jo Kim, Bucheon-si (KR); Sang Chul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 612 days.

(21) Appl. No.: 16/730,459

(22) Filed: Dec. 30, 2019

(65) Prior Publication Data
US 2021/0034968 A1  Feb. 4, 2021

(30) Foreign Application Priority Data

Aug. 2, 2019  (KR) .................. 10-2019-0094524

(51) Int. Cl.
| | |
|---|---|
| *G06N 3/08* | (2023.01) |
| *G06F 7/485* | (2006.01) |
| *G06F 7/487* | (2006.01) |
| *G06F 7/552* | (2006.01) |

(52) U.S. Cl.
CPC ............. *G06N 3/08* (2013.01); *G06F 7/485* (2013.01); *G06F 7/4876* (2013.01); *G06F 7/5525* (2013.01)

(58) Field of Classification Search
CPC .......... G06F 17/10; G06F 17/11; G06F 7/485; G06F 7/4876; G06F 7/5525; G06N 3/08; G06N 3/088; G06N 7/00
See application file for complete search history.

(56) References Cited

PUBLICATIONS

Z. Ma et al., Privacy-Preserving Outsourced Speech Recognition for Smart IoT Devices, IEEE Internet of Things Journal, vol. 6, No. 5, May 21, 2019 (Year: 2019).*

H. A. Moghaddam et al., Fast adaptive algorithms and networks for class-separability features, Pattern Recognition 36, p. 1695-1702, 2003 (Year: 2003).*

N. Shazeer et al., Adafactor: Adaptive Learning Rates with Sublinear Memory Cost, Proceedings of the 35th International Conference on Machine Learning, PMLR 80, 2018 (Year: 2018).*

(Continued)

*Primary Examiner* — Emily E Larocque

(74) *Attorney, Agent, or Firm* — Birch, Stewart, Kolasch & Birch, LLP

(57) ABSTRACT

Disclosed is a neural network learning apparatus for deep learning and a method thereof. A neural network learning apparatus for deep learning according to an embodiment of the present disclosure includes an input interface, a memory, and a learning processor for applying a Gradient Descent algorithm to a neural network model, and the learning processor may transform a cumulative change function of the gradient for an error function into an inverse square root function in the Gradient Descent algorithm, and operate an inverse square root approximate value by using a Newton-Raphson method for the transformed inverse square root function. The neural network learning apparatus for deep learning of the present disclosure may be connected or converged with an Artificial Intelligence module, an Unmanned Aerial Vehicle (UAV), a robot, an Augmented Reality (AR) apparatus, a Virtual Reality (VR) apparatus, or a 5G network service-related apparatus, etc.

17 Claims, 7 Drawing Sheets

(56) References Cited

PUBLICATIONS

Y. Lu et al., Block Mean Approximation for Efficient Second Order Optimization, arXiv:1804.05484v3 [cs.LG], 2018 (Year: 2018).*
D.A. Patterson et al., Computer Organization and Design: The Hardware/Software Interface, Elsevier, Ch 1, and Ch 3, 2007 (Year: 2007).*
K. Gurney, An introduction to neural networks, Taylor & Francis Group, 1997, Ch 5 (Year: 1997).*

* cited by examiner

[FIG. 1]
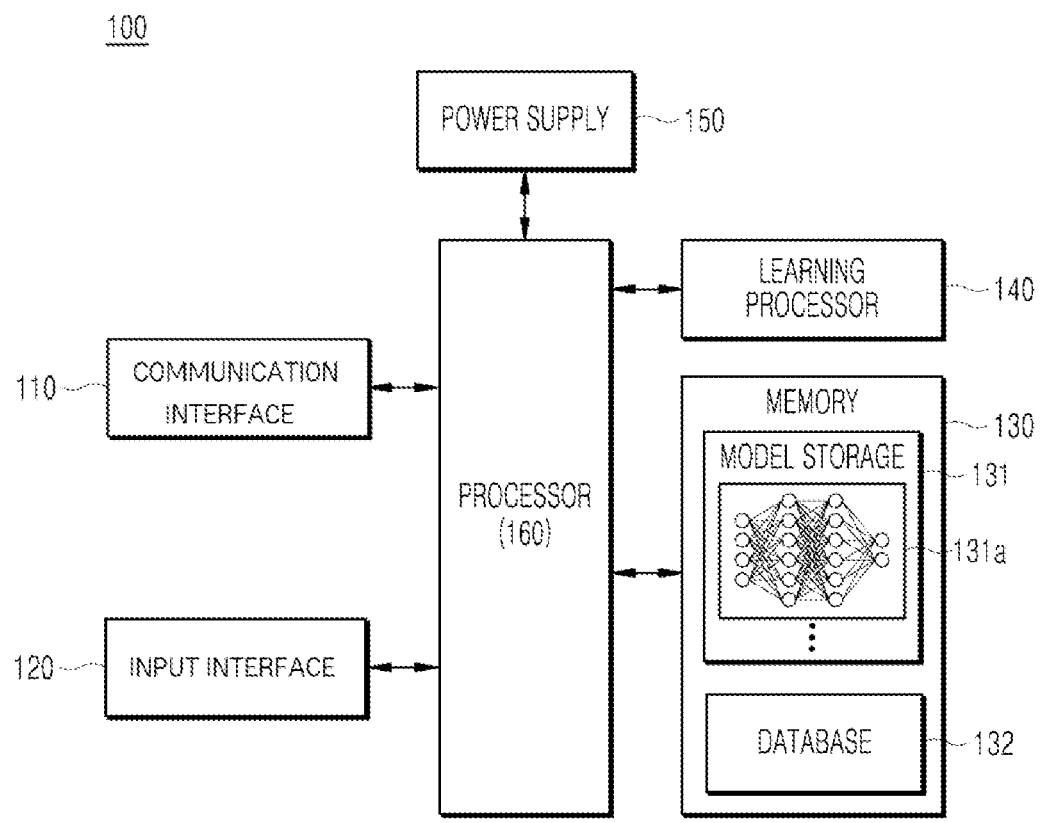

[FIG. 2]
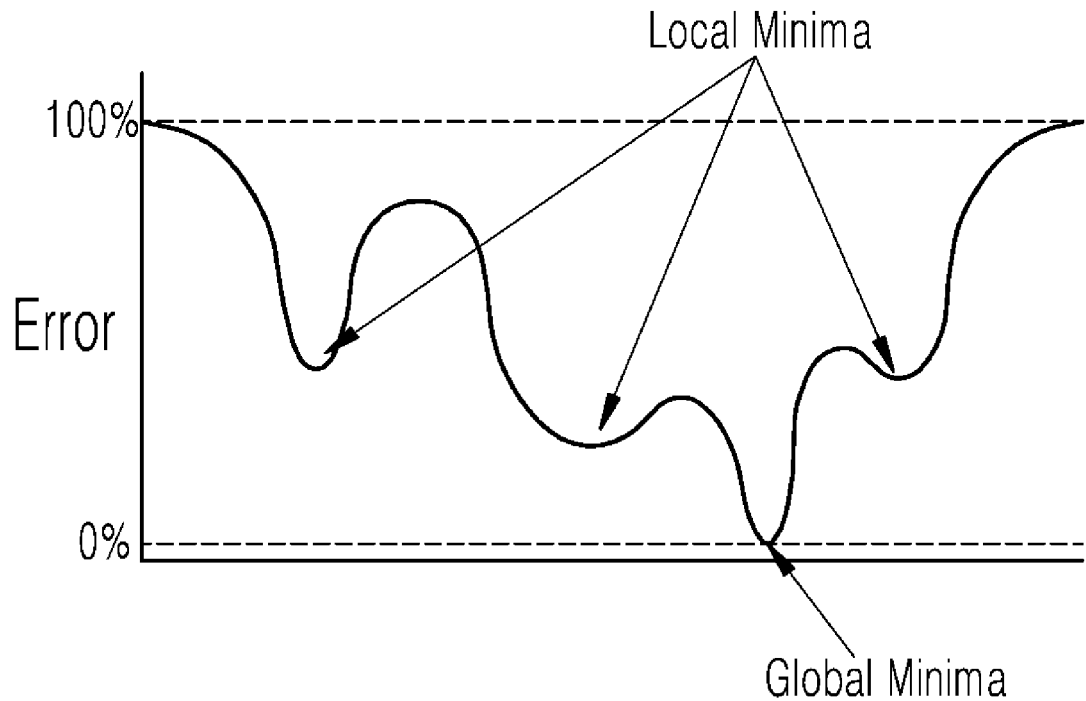
[FIG. 3]
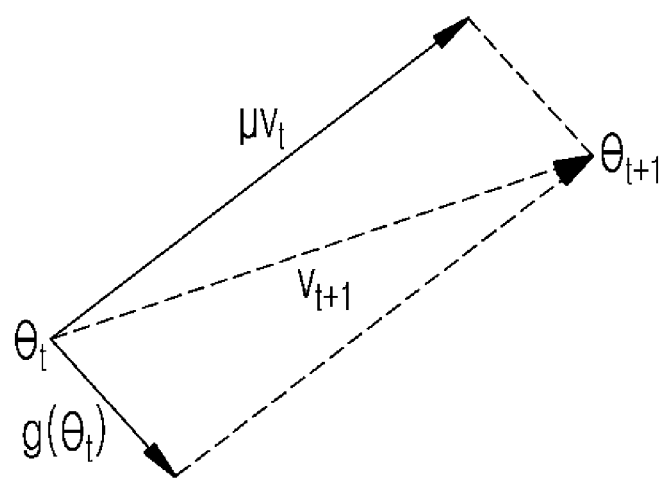

[FIG. 4]
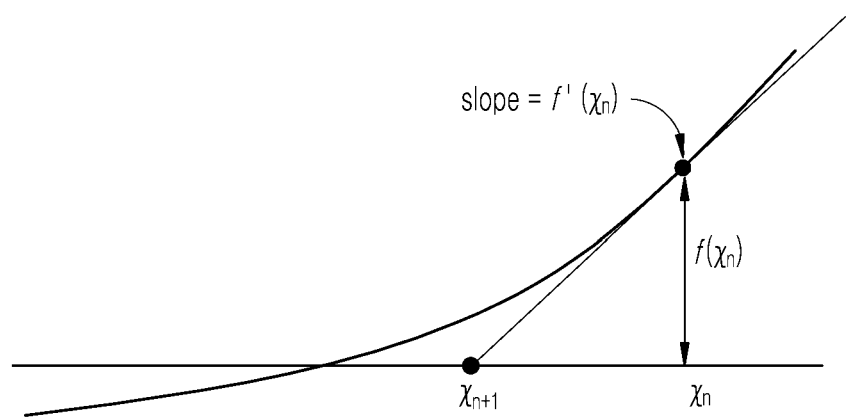

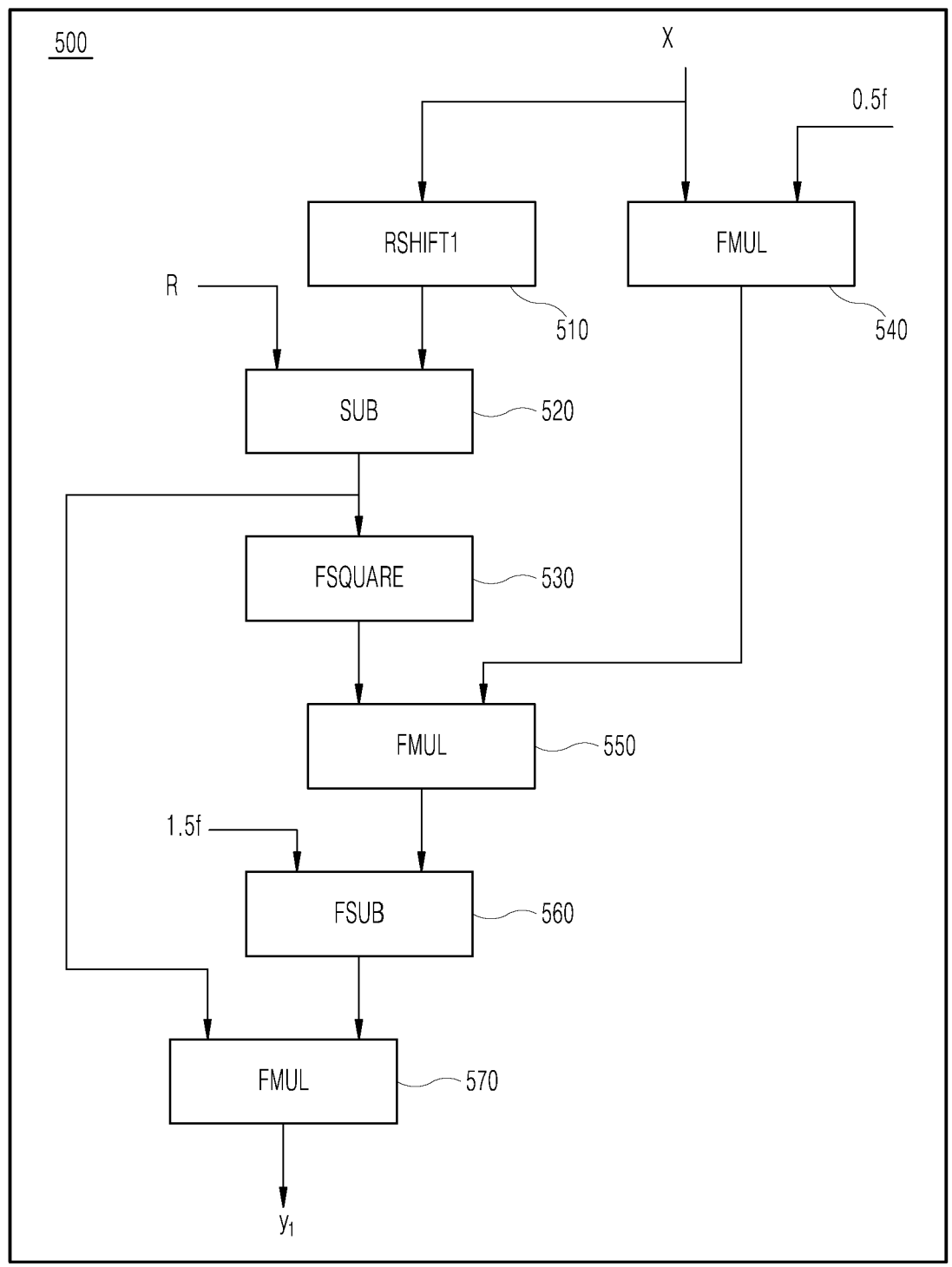
[FIG. 5]

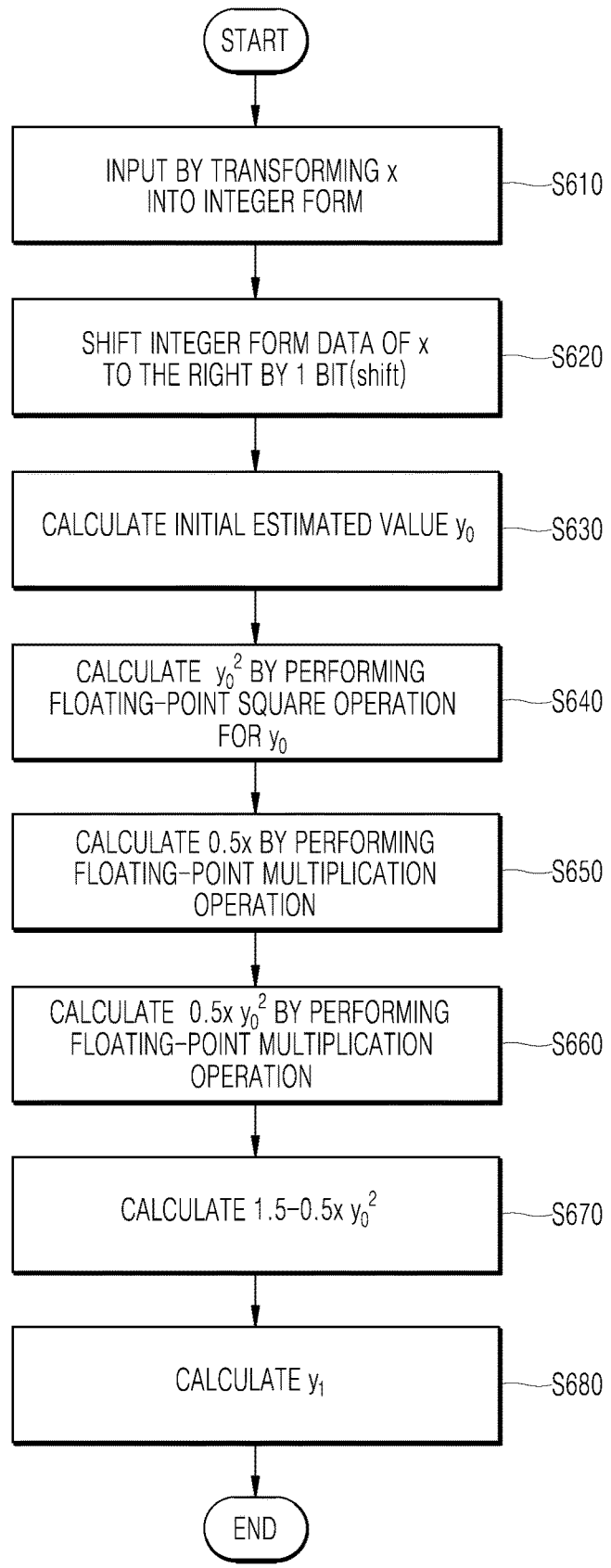

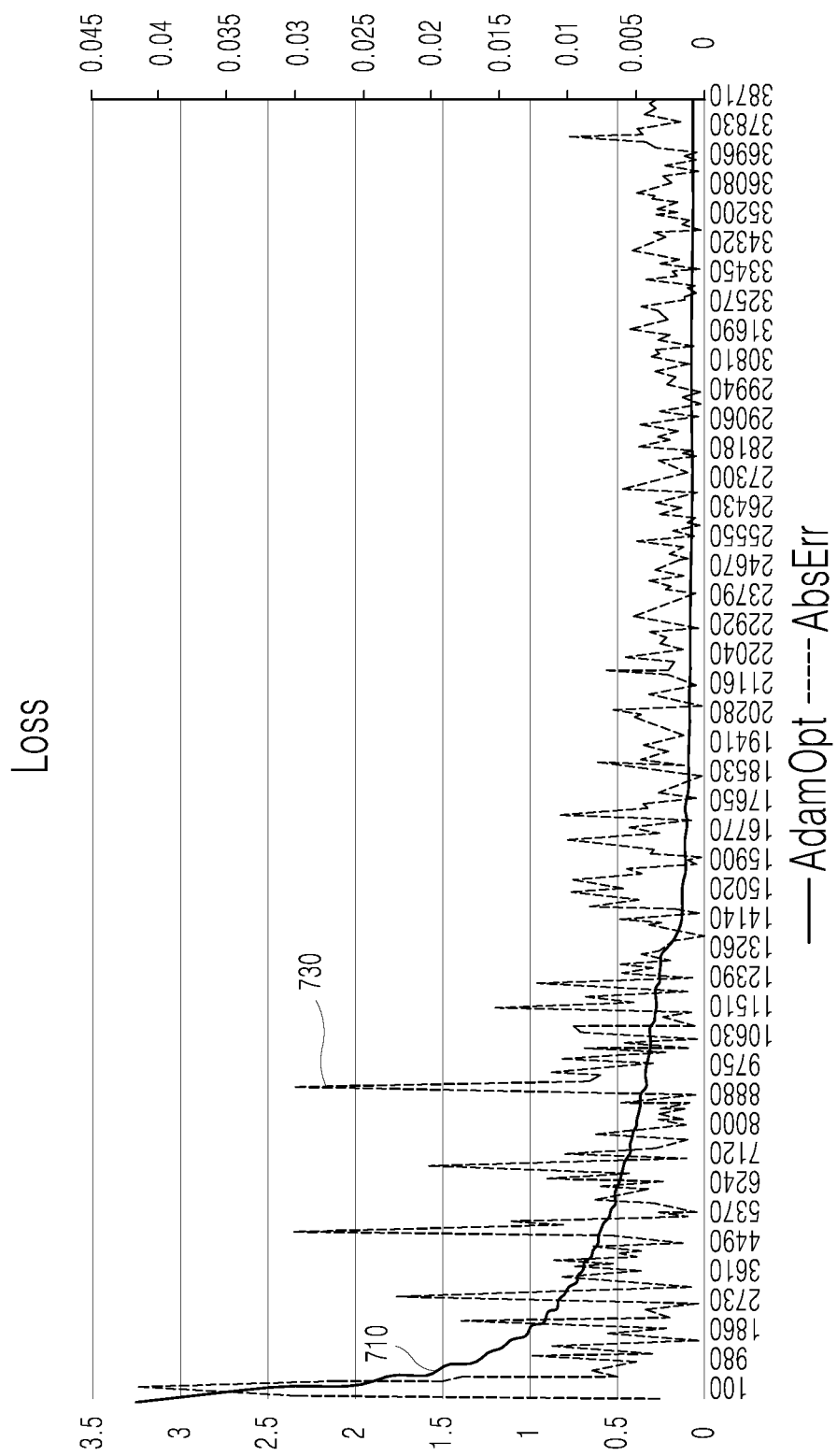

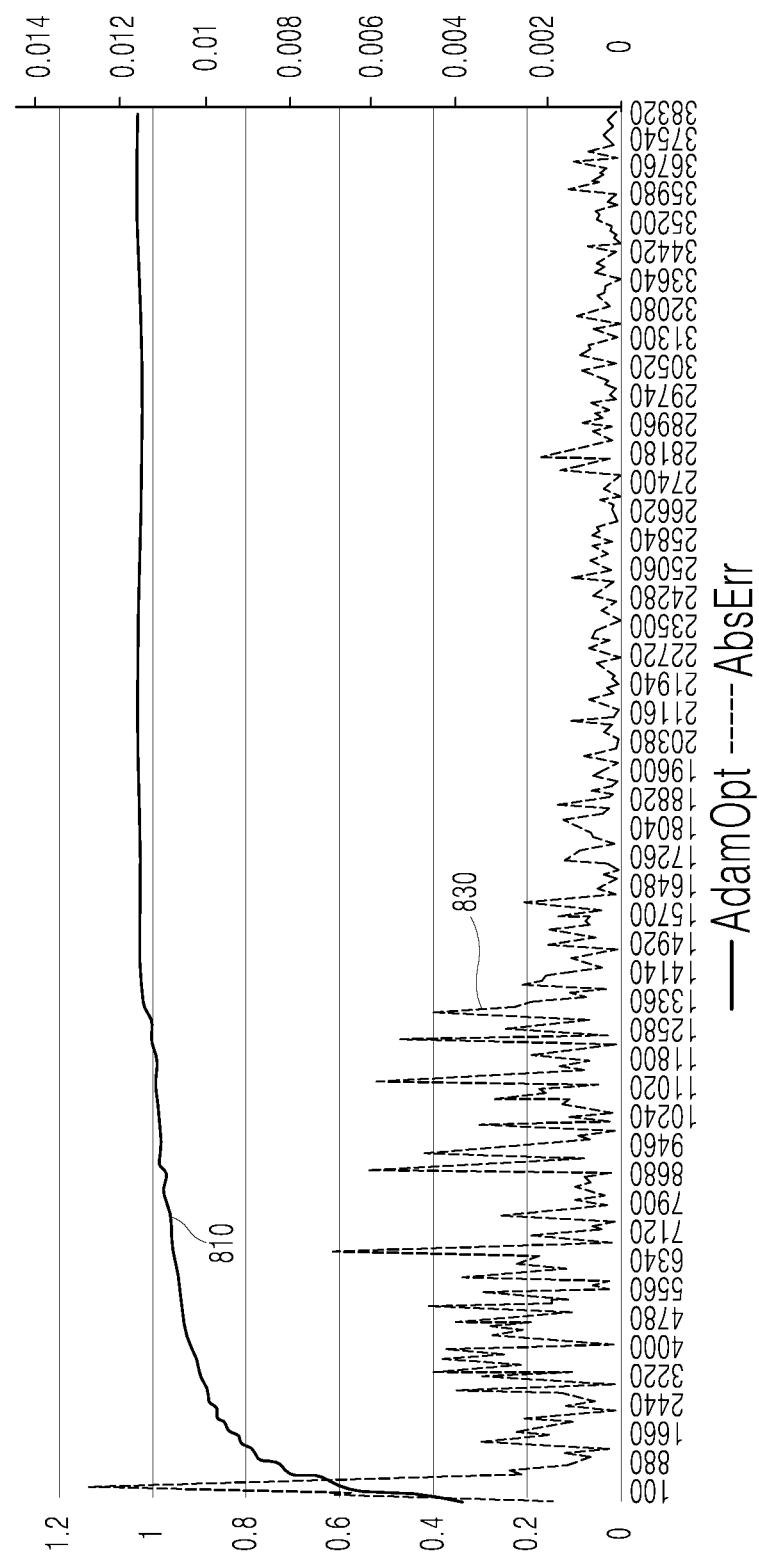
[FIG. 8]

NEURAL NETWORK LEARNING APPARATUS FOR DEEP LEARNING AND METHOD THEREOF

CROSS-REFERENCE TO RELATED APPLICATION

This present application claims the benefit of priority to Korean Patent Application No. 10-2019-0094524, entitled "NEURAL NETWORK LEARNING APPARATUS FOR DEEP LEARNING AND METHOD THEREOF," filed in the Republic of Korea on Aug. 2, 2019, the entire disclosure of which is incorporated herein by reference.

BACKGROUND

1. Technical Field

The present disclosure relates to a neural network learning apparatus for deep learning and a method thereof, and more particularly, to a neural network learning apparatus for deep learning including a Newton-Raphson method based inverse square root operator for providing a neural network optimization algorithm and a method thereof.

2. Description of Related Art

In general, a Gradient Descent algorithm used in a neural network optimization technique is a method for shifting the weight in the direction of differentiating the error function to reduce the error, and includes a problem in that it takes a long time to learn when calculating the error because it uses the entire data set.

Accordingly, in order to solve the long-running problem, a Stochastic Gradient Descent (SGD), which uses one data set (batch size 1) per iteration, and a Mini-batch Stochastic Gradient Descent, which uses a mini-batch (batch size 10 to 1000) that is a unit of a data set randomly selected, are recently used.

In this situation, since the update is performed by looking at a part of the data set rather than updating by reflecting all of the entire data set, a faster update is possible. However, there exists a problem in that the optimization of the neural network in using the Gradient Descent does not reach a Global Minima and may settle at a Local Minima.

That is, in the situation of a Stochastic Gradient Descent, there are two problems of 1) a problem capable of settling at the Local Minima and in addition, 2) the time required for optimization described above, such that there exists various neural network optimization algorithms having advanced the above.

For example, there are Momentum and NAG having modified a gradient, Adagrad, RMSProp, and AdaDelta having modified a learning rate, and Adam and Nadam having combined the modified gradient and learning rate, etc., as the representative examples.

However, even in the situation of the various neural network optimization algorithms described above, an enormous time is required for learning due to the complexity of the algorithm itself used for the Gradient Descent and the iterative calculation of the mini-batch, and the costly operational processing capability, such as parallel computing is also required.

Accordingly, various methods for optimizing the algorithm used for the Gradient Descent have been studied, in order to increase the speed of the learning rate, reduce power consumption, and reduce the chip area, etc.

SUMMARY OF THE DISCLOSURE

The present disclosure is intended to solve the above problems, and an object of the present disclosure is to provide a neural network learning apparatus for deep learning applying a neural network optimization algorithm and a method thereof.

In addition, another object of the present disclosure is to provide a neural network learning apparatus to optimize a neural network for deep learning, which includes an inverse square root operator applying a linear approximation for a logarithmic function and a Newton-Raphson method for an optimum inverse square root operation of a neural network algorithm, and a method thereof.

A learning apparatus to optimize neural network according to an embodiment of the present disclosure may include an input interface for obtaining input data or training data, a memory for storing the input data, the training data, and a neural network model for deep learning, and a learning processor for applying a Gradient Descent algorithm to the neural network model, and the learning processor may transform a cumulative change function of the gradient on an error function into an inverse square root function in the Gradient Descent algorithm, and operate an inverse square root approximate value by using a Newton-Raphson method for the transformed inverse square root function.

In addition, in the neural network learning apparatus according to an embodiment of the present disclosure, the transforming into the inverse square root function may transform it into the inverse square root function by shifting an error prevention constant value $\epsilon$ into an inverse square root, in the cumulative change function of the gradient.

In addition, in the neural network learning apparatus according to an embodiment of the present disclosure, the learning processor may include an inverse square root operator composed of a shifter, an integer subtractor, a floating-point subtractor, and a floating-point multiplier.

In addition, in the neural network learning apparatus according to an embodiment of the present disclosure, the inverse square root operator may calculate an initial estimated value $y_0$ for an input x by using the linear approximation for the logarithmic function.

In addition, in the neural network learning apparatus according to an embodiment of the present disclosure, the inverse square root operator may perform an inverse square root operation while changing a value of a constant R.

In addition, in the neural network learning apparatus according to an embodiment of the present disclosure, the value of the constant R may be determined in the direction of minimizing an error value of an approximate value corresponding to an error prevention constant value $\epsilon$.

In addition, in the neural network learning apparatus according to an embodiment of the present disclosure, the inverse square root operator may receive by transforming a single precision floating-point x into an integer form, obtain a data value after shifting the integer form data of the received x to the right by 1 bit, obtain an initial estimated value $y_0$ by subtracting the obtained data value from a constant R, obtain $y_0^2$ by performing a floating-point square operation for the obtained initial estimated value $y_0$, obtain $0.5x$ by performing a floating-point multiplication operation for the single precision floating-point x, obtain $0.5xy_0^2$ by performing the floating-point multiplication operation for the obtained $0.5x$ and $y_0^2$, obtain $1.5-0.5xy_0^2$ by performing a floating-point subtraction operation for the obtained $0.5xy_0^2$ from 1.5, and obtain an approximate value on $y_1$ by performing the floating-point multiplication operation by using the obtained $1.5-0.5xy_0^2$ and initial estimated value $y_0$.

A neural network learning method to optimize neural network for deep learning according to an embodiment of the present disclosure may include receiving by transforming a single precision floating-point x into an integer form, obtaining a data value after shifting the integer form data of the received x to the right by 1 bit, obtaining an initial estimated value $y_0$ by subtracting the obtained data value from a constant R, obtaining $y_0^2$ by performing a floating-point square operation for the obtained initial estimated value $y_0$, obtaining 0.5x by performing a floating-point multiplication operation for the single precision floating-point x, obtaining $0.5xy_0^2$ by performing the floating-point multiplication operation on the obtained 0.5x and $y_0^2$, obtaining $1.5-0.5xy_0^2$ by performing a floating-point subtraction operation for the obtained $0.5xy_0^2$ from 1.5, and obtaining an approximate value on $y_1$ by performing the floating-point multiplication operation by using the obtained $1.5-0.5xy_0^2$ and initial estimated value $y_0$.

In addition, the neural network learning method according to an embodiment of the present disclosure includes further repeating a Newton-Raphson method by using the approximate value on the $y_1$.

In addition, in the neural network learning method according to an embodiment of the present disclosure, a value of the constant R may be determined in the direction of minimizing an error value of the approximate value corresponding to an error prevention constant value $\epsilon$.

Meanwhile, as an embodiment of the present disclosure, a computer readable recording medium that has recorded a program for executing the above-described method in a computer may be provided.

The learning apparatus according to an embodiment of the present disclosure may use the inverse square root operator applying the linear approximation for the logarithmic function and the Newton-Raphson method, thereby designing the digital circuit with only the multiplier and the adder (subtractor) without using a special function unit or a divider.

The learning apparatus according to an embodiment of the present disclosure may use the inverse square root operator composed of only the multiplier and the adder (subtractor), thereby expecting the excellent effect on improving the chip area and the power consumption.

In another aspect of the present disclosure, a learning method to optimize neural network using a Gradient Descent algorithm, performed by a learning processor, can comprise transforming a cumulative change function of a gradient for an error function into an inverse square root function in the Gradient Descent algorithm, operating an inverse square root approximate value by using a Newton-Raphson method for the transformed inverse square root function, and applying the Gradient Descent algorithm to the neural network model to generate the optimal neural network.

BRIEF DESCRIPTION OF THE DRAWINGS

FIG. 1 is a block diagram illustrating a configuration of a learning apparatus according to an embodiment of the present disclosure.

FIG. 2 is a diagram illustrating a Local Minima and a Global Minima in the loss (error) function.

FIG. 3 is a diagram schematically illustrating a Momentum algorithm with an inertia term added in a Gradient Descent.

FIG. 4 is a diagram illustrating a method for finding the solution with a Newton-Raphson method in an f(x) equation.

FIG. 5 is a diagram illustrating a structure of an inverse square root operator of the neural network learning apparatus for deep learning according to an embodiment of the present disclosure.

FIG. 6 is a flowchart for explaining a neural network learning method for deep learning according to an embodiment of the present disclosure.

FIGS. 7 and 8 are diagrams illustrating the result of having learned image classification by using a CIFAR-10 dataset from a googLeNet in Tensorflow as Loss and Top-1 Accuracy.

DETAILED DESCRIPTION OF THE EMBODIMENTS

Hereinafter, the embodiments disclosed in the present specification will be described in detail with reference to the accompanying drawings, the same or similar elements regardless of a reference numeral is denoted by the same reference numeral and a duplicate description thereof will be omitted. The suffixes "module" and "unit" for the element used in the following description are given or mixed considering only ease of writing specification, and do not have their own meaning or role. Wherever possible, the same reference numbers will be used throughout the drawings to refer to the same or like parts.

In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it may be directly connected or coupled to the other element, but intervening elements may also be present. The terms "connected" and "coupled" are not restricted to physical or mechanical connections or couplings, and may include electrical connections or couplings, whether direct or indirect. The connection may be such that the objects are permanently connected or releasably connected.

Artificial intelligence (AI) is a field of computer engineering and information technology that researches a method for the computer to enable thinking, learning, self-development, etc. which are possible by human's intelligence, and means that the computer may imitate human's intelligent behavior.

In addition, the Artificial Intelligence does not exist in itself, but has many direct and indirect links with other fields of computer science. In recent years, there have been numerous attempts to introduce an element of AI into various fields of information technology to solve problems in the respective fields.

Machine Learning is a field of Artificial Intelligence, and a field of research that gives the ability capable of learning without an explicit program in the computer.

Specifically, the Machine Learning may be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Many Machine Learning algorithms have been developed on how to classify data in the Machine Learning. Decision Tree, Bayesian network, Support Vector Machine (SVM), Artificial Neural Network (ANN), etc. are representative examples.

The Decision Tree is an analytical method that performs classification and prediction by plotting a Decision Rule in a tree structure.

Bayesian network may include a model that represents the probabilistic relationship (conditional independence) among a set of variables. Bayesian network may be appropriate for data mining via unsupervised learning.

The Support Vector Machine is a model of Supervised Learning for pattern recognition and data analysis, and mainly used for classification and regression.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that has artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network may include the synapse for connecting between neuron and neuron.

The Artificial Neural Network may be generally defined by three factors, that is, (1) a connection pattern between neurons of different layers, (2) a learning process updating the weight of connection, (3) an activation function generating an output value from the weighted sum of the input received from a previous layer.

The Artificial Neural Network may include network models of the method such as Deep Neural Network (DNN), Recurrent Neural Network (RNN), Bidirectional Recurrent Deep Neural Network (BRDNN), Multilayer Perceptron (MLP), and Convolutional Neural Network (CNN), but is not limited thereto.

In the present specification, the term 'layer' may be used interchangeably with the term 'class.'

An ANN may be classified as a single-layer neural network or a multi-layer neural network, based on the number of layers therein.

In general, a single-layer neural network may include an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer may be a representative Artificial Neural Network that implements Deep Learning, which is a type of Machine Learning technology.

The Artificial Neural Network may be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Then, among the thus inferred functions, outputting consecutive values is referred to as regression, and predicting and outputting a class of an input vector is referred to as classification.

In the Supervised Learning, the Artificial Neural Network is learned in a state where a label for the training data has been given.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, in the present specification, setting the label to the training data for training of the Artificial Neural Network is referred to as labeling the labeling data on the training data.

Training data and labels corresponding to the training data together may form a single training set, and as such, they may be inputted to an artificial neural network as a training set.

Meanwhile, the training data represents a plurality of features, and the labeling the label on the training data may mean that the feature represented by the training data is labeled. In this situation, the training data may represent the feature of the input object in the form of a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In the present specification, the term 'layer' may be used interchangeably with the term 'class.'

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve to fool the discriminator as effectively as possible, while the discriminator evolves to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

The Reinforcement Learning may be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current gradient of the cost function.

The direction in which the model parameters are to be adjusted may be referred to as a step direction, and a size by which the model parameters are to be adjusted may be referred to as a step size.

Here, the step size may mean a learning rate.

GD obtains a gradient of the cost function through use of partial differential equations, using each of model parameters, and updates the model parameters by adjusting the model parameters by a learning rate in the direction of the gradient.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

Hereinafter, the present disclosure will be described in detail with reference to the accompanying drawings.

FIG. 1 is a block diagram illustrating a configuration of a learning apparatus 100 according to an embodiment of the present disclosure.

The learning apparatus 100 may be an apparatus capable of performing machine learning by using training data, and may include an apparatus for learning by using a model composed of an artificial neural network.

That is, the learning apparatus 100 may be configured to receive, classify, store, and output information to be used for data mining, data analysis, intelligent decision making, and a machine learning algorithm. Here, the machine learning algorithm may include a deep learning algorithm.

The learning apparatus 100 may communicate with at least one external apparatus or terminal, and derive a result by analyzing or learning data on behalf of or by assisting the external apparatus. Here, the assistance of another apparatus may mean the distribution of the operational force through the distributed processing.

The learning apparatus 100 is various apparatuses for learning the artificial neural network, and may generally mean a server, and may be referred to as a neural network learning apparatus or a neural network learning server, etc.

In particular, the learning apparatus 100 may be implemented not only as a single server but also as a plurality of server sets, a cloud server, or a combination thereof.

That is, the learning apparatus 100 may be configured in plural to constitute a neural network learning apparatus set (or cloud server), and at least one learning apparatus 100 included in the neural network learning apparatus set may derive the result by analyzing or learning data through the distributed processing.

The learning apparatus 100 may transmit a model learned by machine learning or deep learning to an external apparatus periodically or by request.

Referring to FIG. 1, the learning apparatus 100 may include a communication interface 110, an input interface 120, a memory 130, a learning processor 140, a power supply unit 150, a processor 160, etc.

The communication interface 110 may mean a configuration that includes a wireless communication interface and an interface unit. That is, the communication interface 110 may transmit and receive data with other apparatuses through wired/wireless communication or an interface.

The input interface 120 may obtain input data for obtaining an output by using training data for model learning or a learned model, etc.

The input interface 120 may also obtain raw input data, and in this situation, the learning processor 140 or the processor 160 may generate training data that may be input to the model learning by preprocessing the obtained data or the preprocessed input data.

At this time, the preprocessing of the input data performed by the input interface 120 may mean extracting an input feature from the input data.

In addition, the input interface 120 may also obtain data by receiving data through the communication interface 110.

The memory 130 may store a model learned by the learning processor 140 or the learning apparatus 100.

At this time, the memory 130 may store the learned model by classifying the learned model into a plurality of versions according to a learning time point or a learning progress level, etc. as necessary.

At this time, the memory 130 may store the input data obtained from the input interface 120, the learning data (or training data) used for model learning, the learning history of the model, etc.

At this time, the input data stored in the memory 130 may be not only data processed to be suitable for model learning, but also raw input data itself.

The memory 130 may include a model storage unit 131, a database 132, etc.

The model storage unit 131 stores a neural network model (or artificial neural network 131a) being learned or learned through the learning processor 140, and stores the updated model when the model is updated through the learning.

At this time, the model storage unit 131 may store the learned model by classifying the learned model into a plurality of versions according to a learning time point or a learning progress level, etc. as necessary.

The artificial neural network 131a illustrated in FIG. 1, is provided as an example of an artificial neural network including a plurality of hidden layers. However, an artificial neural network according to the embodiments of the present disclosure is not limited thereto.

The artificial neural network 131a may be implemented in hardware, software, or a combination of hardware and software. Here, when the artificial neural network 131a is partially or completely implemented as software, one or more commands, which constitute the artificial neural network 131a, may be stored in the memory 130.

The database 132 may store the input data obtained from the input interface 120, the learning data (or training data) used for model learning, the learning history of the model, etc.

The input data stored in the database 132 may be not only data processed to be suitable for model learning, but also raw input data itself.

The learning processor 140 may train (or learn) the artificial neural network 131a by using training data or a training set.

The learning processor 140 may learn the artificial neural network 131a by directly obtaining data having preprocessed the input data obtained by the processor 160 through the input interface 120, or learn the artificial neural network 131a by obtaining the preprocessed input data stored in the database 132.

Specifically, the learning processor 140 may determine the optimized model parameters of the artificial neural network 131a by repeatedly learning the artificial neural network 131a by using the various learning techniques described above.

In the present specification, an artificial neural network whose parameters have been determined by being learned by using the training data may be referred to as a learning model or a trained model.

At this time, the learning model may also infer a result value in a state mounted in the artificial neural network learning apparatus 100, or may also be mounted in another apparatus by being transmitted to another apparatus such as a terminal or an external apparatus through the communication interface 110.

In addition, when the learning model is updated, the updated learning model may be mounted by being transmitted to another apparatus such as a terminal or an external apparatus through the communication interface 110.

In addition, the learning model may be used to infer the result value for new input data rather than the training data.

The learning processor 140 may be configured to receive, classify, store, and output information to be used for data mining, data analysis, intelligent decision making, and machine learning algorithm and technique.

The learning processor 140 may include one or more memory units configured to store data received, detected, sensed, generated, predetermined or output by another component, an external device, or an apparatus communicating with the learning apparatus 100.

The learning processor 140 may include a memory integrated or implemented in the learning apparatus 100. In some embodiments, the learning processor 140 may be implemented by using the memory 130.

Alternatively or additionally, the learning processor 140 may be implemented by using an external memory coupled directly to the terminal or a memory connected with the terminal such as a memory maintained in a server communicating with the terminal.

In another embodiment, the learning processor 140 may be implemented by using a memory maintained in the cloud computing environment, or another remote memory position accessible by the terminal through a communication method such as a network.

The learning processor 140 may be typically configured to store data in one or more databases in order to identify, index, categorize, operate, store, retrieve, and output data for use in supervised or unsupervised learning, data mining, predictive analysis, or other machines. Here, the database may be implemented by using the memory 130, the memory maintained in the cloud computing environment, or the another remote memory position accessible by the terminal through the communication method such as a network.

The information stored in the learning processor 140 may be used by the processor 160 by using any of various different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 160 may determine or predict at least one executable operation of the learning apparatus 100 based on the information determined or generated by using determined by using data analysis and a machine learning algorithm. For this purpose, the processor 160 may request, retrieve, receive, or utilize data of the learning processor 140, and control the learning apparatus 100 to execute the predicted operation or an operation determined to be preferable of the at least one executable operation.

The processor 160 may perform various functions for implementing intelligent emulation (i.e., a knowledge-based system, an inference system, and a knowledge acquisition system). This may be applied to various types of systems (e.g., fuzzy logic system) including an adaptive system, a machine learning system, an artificial neural network, etc.

The processor 160 may also include a sub module for enabling operation accompanied by speech and natural language speech processing, such as an I/O processing module, an environmental condition module, a Speech-to-Text (STT) processing module, a natural language processing module, a workflow processing module, and a service processing module.

Each of these sub modules may have access to one or more systems or data and models at the terminal, or a subset or superset thereof. In addition, each of these sub modules may provide various functions including a lexical index, a user data, a workflow model, a service model, and an automatic speech recognition (ASR) system.

In another embodiment, another aspect of the processor 160 or the learning apparatus 100 may be implemented by the sub module, the system, or the data and the model.

In some examples, based on the data of the learning processor 140, the processor 160 may be configured to detect and sense the requirement based on the contextual condition or the user's intention expressed in user input or natural language input.

The processor 160 may actively derive and obtain the information required for completely determining the requirement based on the contextual condition or the user's intention. For example, the processor 160 may actively derive the information required for determining the requirement by analyzing historical data including the past input and output, pattern matching, an unambiguous word, input intention, etc.

The processor 160 may determine a task flow for executing a function responding to the requirement based on the contextual condition or the user's intention.

The processor 160 may be configured to collect, sense, extract, detect, and/or receive a signal or data used for data analysis and machine learning work through one or more sensing components in the terminal, in order to collect information for processing and storage in the learning processor 140.

Information collection may include sensing information through a sensor, extracting information stored in the memory 130, or receiving information from an external terminal, an entity or an external storage apparatus through a communication means.

The processor 160 may collect usage history information from the learning apparatus 100 to store it in the memory 130.

The processor 160 may determine the best match for executing a specific function by using the stored usage history information and predictive modeling.

The processor 160 may receive image information (or corresponding signal), audio information (or corresponding signal), data or user input information from the input interface 120.

The processor 160 may collect the information in real time, process or classify the information (e.g., knowledge graph, command policy, personalization database, conversation engine, etc.), and store the processed information in the memory 130 or the learning processor 140.

When the operation of the learning apparatus 100 is determined based on the data analysis and the machine learning algorithm and technique, the processor 160 may control the component of the learning apparatus 100 in order to execute the determined operation. In addition, the processor 160 may perform the determined operation by controlling the learning apparatus 100 according to a control command.

When a specific operation is performed, the processor 160 may analyze historical information indicating execution of the specific operation through the data analysis and the machine learning algorithm and technique, and update the previously learned information based on the analyzed information.

Accordingly, the processor 160, together with learning processor 140, may improve the accuracy of future performance of the data analysis and the machine learning algorithm and technique based on the updated information.

The power supply unit 150 includes an apparatus for supplying power to the respective components included in the learning apparatus 100 by receiving an external power or an internal power under the control of the processor 160.

In addition, the power supply unit 150 includes a battery, and the battery may be a built-in battery or a replaceable battery.

Specifically, a neural network optimization method that may be performed by the learning processor 140 will be described.

A Gradient Descent algorithm used in the neural network optimization technique is a method for shifting the weight in the direction of differentiating the error function to reduce an error, and has a problem in that it takes a long time to learn when calculating the error because it uses the entire data set.

Accordingly, in order to solve the long-running problem, a Stochastic Gradient Descent (SGD), which uses one data set (batch size 1) per iteration, and a Mini-batch Stochastic Gradient Descent, which uses a mini-batch (batch size 10 to 1000) that is a unit of a data set randomly selected, are recently used.

In this situation, since the update is performed by looking at a part of the data set rather than updating by reflecting all of the entire data set, a faster update is possible. However, the optimization of the neural network in using the Gradient Descent has a problem in that it does not reach a Global Minima and may settle at a Local Minima.

FIG. 2 is a diagram illustrating a Local Minima and a Global Minima in the loss (error) function.

That is, since there occurs a problem that does not reach the Global Minima and settles at the Local Minima according to the step size (learning rate) in the situation of using the Stochastic Gradient Descent, various neural network optimization methods have been discussed in order to solve this problem.

In general, the neural network optimization algorithm is expressed by the equation including a learning rate ($\eta$) and a gradient ($\partial E/\partial w$) as in the following Equation 1.

$$w_{t+1} = w_t - \eta * \frac{\partial E}{\partial w} \qquad \text{Equation 1}$$

Here, the learning rate determines how much to reflect to learning at a time, and the gradient represents in which direction to learn. In the situation of the Stochastic Gradient Descent (SGD), since there are the above-described two problems of the time required for the optimization, as well as the problem of settling at the Local Minima, various neural network optimization algorithms having advanced the above have been proposed.

For example, there are momentum and NAG having modified a gradient, Adagrad, RMSProp, and AdaDelta having modified a learning rate, Adam and Nadam having combined the modified gradient and learning rate, etc. as the representative examples.

Here, the background description of the present disclosure briefly describes only the Momentum, the RMSProp, and the Adam algorithm combining the advantages of both due to a space constraint.

FIG. 3 is a diagram schematically illustrating a Momentum algorithm with an inertia term added in the Gradient Descent.

Referring to FIG. 3, the Momentum algorithm is a method for correcting the current gradient by using the direction in which the accumulated past gradient is directed as the inertia, has the inertia term added to the Gradient Descent Equation, and may be expressed as in the following Equations 2 and 3.

$$v_{t+1} = \mu v_t - \eta g(\theta_t) \qquad \text{Equation 2}$$

$$\theta_{t+1} = \theta_t + v_{t+1} \qquad \text{Equation 3}$$

Referring to the Equation 2, the $\mu$ refers to a weight for inertia and the $\eta$ refers to a learning rate. The $v_0$ is initialized to 0, and each time the optimization is repeated, the current gradient ($-\eta g(\theta_t)$) accumulates at the next inertia $v_{t+1}$.

Next, the RMSProp is an algorithm expressed by changing the gradient accumulation of the AdaGrad into an exponentially weighted moving average, and may be expressed as in the following Equations 4 and 5.

$$E_t = \gamma E_{t-1} + (1-\gamma)g(\theta_t)^2 \qquad \text{Equation 4}$$

$$\theta_{t+1} = \theta_t - \frac{\eta}{\sqrt{E_t + \epsilon}} g(\theta_t) \qquad \text{Equation 5}$$

In the Equation 4, the $E_t$ refers to a cumulative square gradient, the $E_0$ has an initial value of 0, and the square gradient is accumulated by using a decay rate $\gamma$. In the Equation 5, the η refers to a global learning rate and a constant value $\epsilon$ is used to prevent a division error by zero.

The Adam is an abbreviation of Adaptive moment estimation, and is a method combining the RMSProp <Equation 7> with the Momentum <Equation 6>, which may be expressed as in the following Equations 6 to 10.

$$m_t = \beta_1 m_{t-1} + (1-\beta_1)g(\theta_t) \quad \text{Equation 6}$$

$$v_t = \beta_2 v_{t-1} + (1-\beta_2)g(\theta_t)^2 \quad \text{Equation 7}$$

$$\widehat{m_t} = \frac{m_t}{1-\beta_1^t} \quad \text{Equation 8}$$

$$\widehat{v_t} = \frac{v_t}{1-\beta_2^t} \quad \text{Equation 9}$$

$$\theta_{t+1} = \theta_t - \eta \frac{\widehat{m_t}}{\sqrt{\widehat{v_t}}+\epsilon} \quad \text{Equation 10}$$

In the Equation 6, the $m_t$ refers to an inertia, the $\beta_1$ refers to an inertia reduction rate and is 0.9. In the Equation 7, the $v_t$ refers to an adaptive inertia, the $\beta_2$ refers to an adaptive inertia reduction rate, and at this time, the reduction rate uses 0.9999. The η in the Equation 10 refers to the global learning rate and likewise, the constant value $\epsilon$ is used to prevent a division error by zero.

The equation for the global learning rate may be expressed as in the following Equations 11 and 12 by modifying the Equations 8, 9, and 10.

$$\eta_t = \eta \frac{\sqrt{1-\beta_2^t}}{1-\beta_1^t} \quad \text{Equation 11}$$

$$\theta_{t+1} = \theta_t - \eta_t \frac{m_t}{\sqrt{v_t}+\epsilon} \quad \text{Equation 12}$$

In addition, by transforming the Equation 12, a constant value $\epsilon$ for preventing a division error by zero may be shifted into the square root of $v_t$ and expressed in the form of $\epsilon^2$ as the following Equation 13.

$$\theta_{n+1} = \theta_t - \eta_t \frac{m_t}{\sqrt{v_t+\epsilon^2}} \quad \text{Equation 13}$$

That is, referring to the Equation 13, the θ function may be expressed in the form of the inverse square root of $v_t+\epsilon^2$.

That is, since the θ function is expressed in the form of the inverse square root of $v_t+\epsilon^2$, the neural network optimization algorithm using the exponential mean of the gradient requires the implementation of a digital circuit of an efficient inverse square root operator.

The neural network learning apparatus for deep learning according to an embodiment of the present disclosure may approximate a solution value by using the Newton-Raphson method.

FIG. 4 is a diagram illustrating a method for finding a solution by the Newton-Raphson method in an f(x) equation.

The Newton-Raphson method is a useful method for approximately finding the solution of the equation f(x)=0.

Referring to FIG. 4, the Newton-Raphson method is a method for gradually finding the solution as in the following Equation 14 while drawing the tangent line at a current x value with respect to a continuous and differential-available function, and shifting x to the point where the tangent line meets the x-axis.

$$x_{n+1} = x_n - \frac{f(x_n)}{f'(x_n)} \quad \text{Equation 14}$$

The Newton-Raphson method may be used variously, and for example, used as a method for finding x, which is f(x)=g(x)−h(x)=0, when finding the solution of f(x)=0, or finding x where the values of two different functions g(x) and h(x) become equal.

In addition, the Newton-Raphson method may also be used to find the maximum value and the minimum value at the pole of f(x), and a method for finding x, which is f(x)=0, by the Newton-Raphson method and then substituting it into the f(x), etc. may be used.

The neural network learning apparatus for deep learning according to an embodiment of the present disclosure optimizes $$\frac{1}{\sqrt{v_t+\epsilon^2}}$$

operation, which may be expressed as $$\frac{1}{\sqrt{x}}$$

assuming as $x=v_t+\epsilon^2$ for convenience of explanation.

If the inverse square root operation for any number x greater than zero has a result close to the initial estimated value $y_0$ as in the following Equation 15, it may be changed as in the following Equation 16.

$$y_0 \approx \frac{1}{\sqrt{x}} \quad \text{Equation 15}$$

$$\frac{1}{y_0^2} \approx x \quad \text{Equation 16}$$

At this time, the error function $f(y_0, x)$ of x for the estimated value $y_0$ of the inverse square root may be expressed as in Equation 17, and a partial differential for $y_0$ may be expressed as in the following Equation 18.

$$f(y_0, x) = \frac{1}{y_0^2} - x = y_0^{-2} - x \quad \text{Equation 17}$$

$$\frac{\partial f}{\partial y_0}(y_0, x) = -2y_0^{-3} \quad \text{Equation 18}$$

By using the original function <Equation 17> and the one-way function <Equation 18>, if the Newton-Raphson method is developed by applying as in the following Equation 19, it may be expressed as in the following Equation 20, and if this is gradually repeated by the number of n times, it may be expressed as in the following Equation 21.

$$y_1 = y_0 - \frac{f(y_0, x)}{\frac{\partial f}{\partial y_0}(y_0, x)} = y_0 - \frac{y_0^{-2} - x}{-2y_0^{-3}}$$ Equation 19

$$y_1 = y_0(1.5 - 0.5xy_0^2)$$ Equation 20

$$y_{n+1} = y_n(1.5 - 0.5xy_n^2)$$ Equation 21

In the neural network learning apparatus for deep learning according to an embodiment of the present disclosure, the inverse square root operation is performed by using a single precision floating-point, and the single precision floating-point is expressed by 32 bits, the first bit indicates the sign, the next 8 bits indicate the exponent, and the remaining 23 bits indicate the significand. The content related to the floating-point is defined in the standard of the Institute of Electrical and Electronics Engineers called IEEE 754.

In the inverse square root operation y for the single precision floating-point x, assuming that the mantissa is $m_x$ and $m_y$, and the exponent is $e_x$ and $e_y$, respectively, it may be expressed as in the following Equation 23 when applying the logarithmic function to both sides of the following Equation 22. Here, assuming that the x has a range that is equal to or smaller than 4.2535296e+37, both x and y may be expressed as a normalized floating-point.

$$y = (1 + m_y)2^{e_y} = x^{-1/2}$$ Equation 22

$$\log_2(1 + m_y) + e_y = -\frac{1}{2}(\log_2(1 + m_x) + e_x)$$ Equation 23

In general, since the logarithmic function may be linearly approximated as in the following Equation 24 when using an appropriate constant σ, it may be expressed as in the following Equation 25 when applying it to the Equation 23.

$$\log_2(1+v) \approx v + \sigma$$ Equation 24

$$m_y + \sigma + e_y \approx -\frac{1}{2}(m_x + \sigma + e_x)$$ Equation 25

Assuming that the mantissa integerized from the single precision floating-point is $M_y$ and $M_x$, and the exponent integerized is $E_x$ and $E_y$, the Equation 25 may be expressed as in the following Equation 26.

$$\frac{M_y}{2^{23}} + \sigma + E_y - 127 \approx -\frac{1}{2}\left(\frac{M_x}{2^{23}} + \sigma + E_x - 127\right)$$ Equation 26

At this time, there have the relationships of $M_y = 2^{23}m_y$ and $E_y = e_y + 127$.

In the Equation 26, when the σ and the constant part may be summarized to the right side, it may be expressed as in the following Equation 27, and the following Equation 28 may be obtained by multiplying both sides of the following Equation 27 by $2^{23}$, which may be expressed as in the following Equation 29 when this is summarized for the initial estimated value $y_0$.

$$\frac{M_y}{2^{23}} + E_y \approx -\frac{1}{2}\left(\frac{M_x}{2^{23}} + E_x\right) + \frac{3}{2}(127 - \sigma)$$ Equation 27

$$M_y + 2^{23}E_y \approx -\frac{1}{2}(M_x + 2^{23}E_x) + 3 \cdot 2^{22}(127 - \sigma)$$ Equation 28

$$y_0 \approx 3 \cdot 2^{22}(127 - \sigma) - \frac{1}{2}(M_x + 2^{23}E_x)$$ Equation 29

In the Equation 29, when the $3 \cdot 2^{22}(127-\sigma)$ is defined as a constant R (magic number R), the following Equation 30 may be finally obtained.

$$y_0 \approx R - \frac{1}{2}(M_x + 2^{23}E_x)$$ Equation 30

In the Equation 30, the constant R may be expressed as 0x5F37BCB6 when the σ is 0.0430357, and as 0x5F3759DF when the σ is 0.0450466.

FIG. 5 is a diagram illustrating a structure of an inverse square root operator 500 of the neural network learning apparatus 100 for deep learning, and FIG. 6 is a flowchart for explaining a neural network learning method for deep learning according to an embodiment of the present disclosure.

Referring to FIG. 5, the inverse square root operator 500 according to an embodiment of the present disclosure includes a shifter (RSHIFT1) 510, an integer subtractor (SUB) 520, a squarer (FSQUARE) 530, floating-point multipliers (FMUL) 540, 550, 570, and a floating-point subtractor (FSUB) 560.

Here, since the squarer (FSQUARE) 530 is included in the floating-point multiplier (FMUL), the inverse square root operator 500 may be composed of the shifter (RSHIFT1) 510, the integer subtractor (SUB) 520, the floating-point subtractor 560, and the floating-point multipliers (FMUL) 530, 540, 550, 570.

That is, the inverse square root operator 500 is an apparatus included in the learning processor 140 and for operating the cumulative change function of the gradient transformed into the inverse square root function, and the inverse square root operator 500 may be eventually an apparatus for optimizing the operation of $$\frac{1}{\sqrt{v_t + \epsilon^2}}.$$

Referring to FIGS. 5 and 6, in operation S610, the inverse square root operator 500 may receive an integer form of a single precision floating-point x by transforming a single precision floating-point x into an integer form.

For example, since the inverse square root operator 500 is an apparatus for optimizing the operation of $$\frac{1}{\sqrt{x}}$$

assuming that $x = v_t + \epsilon^2$, the inverse square root operator 500 may receive the single precision floating-point x by the input interface 120 or the learning processor 140.

At this time, the inverse square root operator 500 may receive by transforming the floating-point x into the integer form.

That is, the floating-point x is composed of a mantissa and an exponent when transformed into a normalized floating-point form, and when transformed into an integer form by using the mantissa and the exponent, a value of $M_x + 2^{23}E_x$, which is a part of the Equation 30, may be obtained.

That is, since the inverse square root operator 500 is an apparatus for calculating the initial estimated value $y_o$ by using the Equation 30, and operating an approximate value optimized by applying the Newton-Raphson method, in operation S610, the inverse square root operator 500 may transform the floating-point x into an integer form to obtain an x value in the form of $M_x+2^{23}E_x$, which is an integer form data of x.

In operation S620, the inverse square root operator 500 may obtain a data value after shifting the received integer form data of x to the right by 1 bit by using the shifter (RSHIFT1510).

For example, the obtaining the data value after shifting the received data of the integer form to the right by 1 bit is mathematically equal to dividing by two.

That is, the data value obtained by the shifter (RSHIFT1) 510 in the operation S620 is equal to 0.5x, and the data value of $\frac{1}{2}(M_x+2^{23}E_x)$ may be obtained in the integer form.

In operation S630, the inverse square root operator 500 may obtain the initial estimated value $y_0$ by subtracting the obtained data value from the constant R by using the integer subtractor (SUB) 520.

That is, in the operation S630, the integer subtractor (SUB) 520 performs subtracting the data value $\frac{1}{2}(M_x+2^{23}E_x)$ from the constant R, and calculating $y_0 \approx R - \frac{1}{2}(M_x+2^{23}E_x)$ expressed by the Equation 30.

In this operation, the inverse square root operator 500 may perform the inverse square root operation while changing the value of the constant R.

That is, as described above, there is a difference in the accuracy of σ according to the value of the constant R, and since the present disclosure obtains the approximate value of the inverse square root as an apparatus for optimizing the operation of $$\frac{1}{\sqrt{v_t + \epsilon^2}},$$

it may perform the inverse square root operation while changing the value of the constant R.

That is, the inverse square root operator 500 may determine the value of the constant R in the direction of minimizing the error value of the approximate value corresponding to the error prevention constant value $\epsilon$ in order to obtain an optimal approximate value of the inverse square root.

Next, operating $y_1 = y_0(1.5 - 0.5xy_0^2)$ of the Equation 20 by using the initial estimated value $y_0$ obtained by the inverse square root operator 500 in the operation S630 will be described.

In operation S640, the inverse square root operator 500 may obtain $y_0^2$ by performing a floating-point square operation for the initial estimated value $y_0$ obtained in the operation S630 by using the squarer (FSQUARE) 530, and in operation S650, the inverse square root operator 500 may obtain 0.5x by performing a floating-point multiplication operation for the single precision floating-point x by using the floating-point multiplier (FMUL) 540.

In operation S660, the inverse square root operator 500 may obtain $0.5xy_0^2$ by performing a floating-point multiplication operation for the 0.5x obtained in the operation S650 and the $y_0^2$ obtained in the operation S640 by using the floating-point multiplier (FMUL) 550.

In operation S670, the inverse square root operator 500 may obtain $1.5 - 0.5xy_0^2$ by performing a floating-point subtraction operation for $0.5xy_0^2$ obtained in the operation S660 from 1.5 by using the floating-point subtractor (FSUB) 560.

In operation S680, the inverse square root operator 500 may obtain an approximate value for $y_1$ by performing a floating-point multiplication operation by using $1.5 - 0.5xy_0^2$ obtained in the operation S670 and the initial estimated value $y_0$ obtained in the operation S630 by using the floating-point multiplier (FMUL) 570.

That is, the approximate value $y_1$ obtained in the operation S680 is obtained by operating the result of the Equation 20, and is to perform the Newton-Raphson method once.

In addition, the inverse square root operator 500 according to an embodiment of the present disclosure may further repeat the Newton-Raphson method by using the approximate value $y_1$ obtained in the operation S680 in order to calculate a more accurate approximate value, and the result may be operated as in the Equation 21.

That is, the neural network learning apparatus for deep learning according to an embodiment of the present disclosure may find the inverse square root by using the inverse square root operator to design the digital circuit with only the multiplier and the adder (subtractor) without using a special functional unit or a divider.

The following Table 1 shows the result of logic synthesis by using a Design Compiler of a Synopsys company at the frequency of 100 MHz in a TSMC 12FFC process.

TABLE 1

| Block | Area | | Power | | |
|---|---|---|---|---|---|
| | Cell Area (um²) | Unit Gates | Dynamic (mW) | Leakage (nW) | Total (mW) |
| DW_fp_invsqrt | 4399.0180 | 33839 | 0.758 | 149.527 | 0.758 |
| Inverse Square Root Operator | 2173.0223 | 16716 | 0.286 | 37.418 | 0.286 |

Referring to the Table 1, as a result of comparing the result of using the inverse square root operator 500 of the present disclosure and the DW_fp_invsqrt included in the DesignWare IP of a Synopsys company, the inverse square root operator 500 shows an area of about half of the DW_fp_invsqrt.

In addition, the inverse square root operator 500 has a leakage power of about 25%, and a total power consumption of about 37% assuming a toggle rate of 10% compared to the DW_fp_invsqrt.

That is, it may be confirmed that the neural network learning apparatus for deep learning 100 according to an embodiment of the present disclosure has excellent improvement effects on the chip area and the power consumption.

FIGS. 7 and 8 are diagrams illustrating the result of having learned image classification by using a CIFAR-10 dataset from a googLeNet in Tensorflow as Loss and Top-1 Accuracy.

For the artificial neural network learning, the neural network optimization algorithm performed the learning by using Adam, setting the batch size to 128, setting the step to 39000, and setting the epoch to 100.

The right auxiliary axis in FIGS. 7 and 8 illustrate the absolute error between the result of applying the Adam algorithm and the result of applying the inverse square root operator of the present disclosure in the Adam algorithm.

In the Loss graph of FIG. 7, an optimum value applying the Adam algorithm is expressed by a solid line 710, the absolute error value is expressed by a dotted line 730, and in the Top-1 Accuracy graph of FIG. 8, an optimum value applying the Adam algorithm is expressed by a solid line 810, and an absolute error value is expressed by a dotted line 830.

Referring to FIGS. 7 and 8, it may be confirmed that the mean square error (MSE) of the Loss graph of FIG. 7 is 4.54E-05, and the mean square error of the Top-1 Accuracy graph of FIG. 8 is a very small value of 3.25E-06.

That is, in terms of accuracy, the neural network learning method itself for deep learning using the inverse square root operator of the present disclosure has an error, but this error affects the weight and is reflected to the gradient through the next forward propagation. That is, since the error itself has been already reflected to the gradient to be accumulated, it may be confirmed that it does not affect the convergence of the gradient to the Global Minima.

Regarding the neural network learning method to optimize neural network according to an embodiment of the present disclosure, the above-described content of the neural network learning apparatus 100 may be applied. Accordingly, regarding the neural network learning method, the same content as that of the neural network learning apparatus 100 described above has been omitted.

The above-mentioned present disclosure may be implemented as a computer-readable code in a recording medium in which at least one program is written. The computer readable medium includes all types of recording devices in which data readable by a computer system readable may be stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. Moreover, the computer may include a processor of a terminal, an electronic device, and the like.

The foregoing description of the present disclosure is intended for illustration, and it will be understood by those skilled in the art to which the present disclosure pertains that the present disclosure may be easily modified in other specific forms without changing the technical spirit of the present disclosure. Accordingly, it should be understood that the above-described embodiments are exemplary in all respects and not restrictive. For example, each component described as a single type may also be embodied in a distributed manner, and likewise, the components described as being distributed may also be embodied in a combined form.

The scope of the present disclosure is shown by the following claims rather than the detailed description, and all changes or modifications derived from the meaning and scope of the claims and their equivalent concepts should be construed as being included in the scope of the present disclosure.

What is claimed is:

1. A learning apparatus to optimize a neural network for automatic speech recognition (ASR), the learning apparatus comprising:
   an input interface configured to obtain input data or training data;
   a communication interface configured to communication with an external apparatus;
   a memory configured to store the input data, the training data, and a neural network model for deep learning; and
   a learning processor configured to:
   collect usage history information corresponding to a specific user and store the usage history in the memory,
   receive contextual condition information related to the specific user and store the contextual condition information in the memory,
   receive a user voice input from the specific user and store the user voice input in the memory,
   apply a Gradient Decent algorithm to the neural network based on the user voice input, the usage history information and the contextual condition information,
   transform a cumulative change function of a gradient for an error function into an inverse square root function in the Gradient Descent algorithm,
   operate an inverse square root approximate value by using a Newton-Raphson method for the inverse square root function,
   train the neural network model based on an output of the Gradient Descent algorithm to generate an updated neural network,
   transmit, via the communication interface, the updated neural network to the external apparatus, and
   apply the updated neural network to recognize an intention of the specific user and execute a specific function corresponding to the intention of the specific user based on the usage history information, the contextual condition information and the voice input.

2. The learning apparatus of claim 1, wherein the learning processor transforms the cumulative change function of the gradient into the inverse square root function based on transforming an error prevention constant value $\epsilon$ into the inverse square root function by shifting the error prevention constant value $\epsilon$ into an inverse square root, in the cumulative change function of the gradient.

3. The learning apparatus of claim 1, wherein the learning processor includes an inverse square root operator including a shifter, an integer subtractor, a floating-point subtractor, and a floating-point multiplier.

4. The learning apparatus of claim 3, wherein the inverse square root operator is configured to calculate an initial estimated value $y_0$ for an input x based on a linear approximation for a logarithmic function.

5. The learning apparatus of claim 3, wherein the inverse square root operator is configured to perform an inverse square root operation while changing a value of a constant R.

6. The learning apparatus of claim 5, wherein the changing the value of the constant R is determined in a direction of minimizing an error value of an approximate value corresponding to an error prevention constant value $\epsilon$.

7. The learning apparatus of claim 3, wherein the inverse square root operator is configured to:
   receive an integer form of a single precision floating-point x by transforming the single precision floating-point x into the integer form,
   obtain a data value after shifting a data of the integer form x to the right by 1 bit,
   obtain an initial estimated value $y_0$ by subtracting the data value from a constant R,
   obtain $y_0^2$ by performing a floating-point square operation for the initial estimated value $y_0$,
   obtain 0.5x by performing a first floating-point multiplication operation for the single precision floating-point x,
   obtain $0.5xy_0^2$ by performing a second floating-point multiplication operation for the 0.5x and $y_0^2$,
   obtain $1.5-0.5xy_0^2$ by performing a floating-point subtraction operation for the 0.5 $xy_0^2$ from 1.5, and
   obtain an approximate value for $y_1$ by performing a third floating-point multiplication operation by using the $1.5-0.5xy_0^2$ and the initial estimated value $y_0$.

8. The learning apparatus of claim 7, wherein the learning processor is further configured to:

repeat the Newton-Raphson method by using the approximate value for the $y_1$.

9. A method of controlling a learning apparatus to optimize a neural network for automatic speech recognition (ASR) using a Gradient Descent algorithm, the method comprising:
   collecting, by a learning processor of the learning apparatus, usage history information corresponding to a specific user and storing the usage history in a memory of the learning apparatus;
   receiving, by the learning processor, contextual condition information related to the specific user and storing the contextual condition information in the memory;
   receiving, by the learning processor, a user voice input from the specific user and storing the user voice input in the memory;
   transforming, by the learning processor, a cumulative change function of a gradient for an error function into an inverse square root function in the Gradient Descent algorithm, the gradient being based on the user voice input, the usage history information and the contextual condition information;
   operating, by the learning processor, an inverse square root approximate value by using a Newton-Raphson method for the inverse square root function;
   training, by the learning processor, the neural network based on an output of the Gradient Descent algorithm to generate an updated neural network;
   transmitting, via a communication interface of the learning apparatus, the updated neural network to an external apparatus; and
   applying, by the learning processor, the updated neural network to recognize an intention of the specific user and execute a specific function corresponding to the intention of the specific user based on the usage history information, the contextual condition information and the voice input.

10. The method of claim 9, wherein the transforming the cumulative change function of the gradient into the inverse square root function includes:
   transforming an error prevention constant value $\epsilon$ into the inverse square root function by shifting the error prevention constant value $\epsilon$ into an inverse square root, in the cumulative change function of the gradient.

11. The method of claim 9, wherein the learning processor includes an inverse square root operator including a shifter, an integer subtractor, a floating-point subtractor, and a floating-point multiplier.

12. The method of claim 11, further comprising:
   calculating, via the inverse square root operator, an initial estimated value $y_0$ for an input x based on a linear approximation for a logarithmic function.

13. The method of claim 11, further comprising:
   performing, via the inverse square root operator, an inverse square root operation while changing a value of a constant R.

14. The method of claim 13, wherein the changing the value of the constant R is determined in a direction of minimizing an error value of an approximate value corresponding to an error prevention constant value $\epsilon$.

15. The method of claim 11, further comprising:
   receiving, via the inverse square root operator, an integer form of a single precision floating-point x by transforming the single precision floating-point x into the integer form,
   obtaining, via the inverse square root operator, a data value after shifting a data of the integer form to the right by 1 bit,
   obtaining, via the inverse square root operator, an initial estimated value $y_0$ by subtracting the data value from a constant R,
   obtaining, via the inverse square root operator, $y_0^2$ by performing a floating-point square operation for the initial estimated value $y_0$,
   obtaining, via the inverse square root operator, 0.5x by performing a first floating-point multiplication operation for the single precision floating-point x,
   obtaining, via the inverse square root operator, $0.5xy_0^2$ by performing a second floating-point multiplication operation for the 0.5x and $y_0^2$,
   obtaining, via the inverse square root operator, $1.5-0.5xy_0^2$ by performing a floating-point subtraction operation for the $0.5 xy_0^2$ from 1.5, and
   obtaining, via the inverse square root operator, an approximate value for $y_1$ by performing a third floating-point multiplication operation by using the $1.5-0.5xy_0^2$ and the initial estimated value $y_0$.

16. The method of claim 15, further comprising:
   repeating the Newton-Raphson method by using the approximate value for the $y_1$.

17. A non-transitory computer readable recording medium in which a computer program for implementing the method of claim 9 has been recorded.

* * * * *